US011600844B2

(12) United States Patent
Taniuchi et al.

(10) Patent No.: US 11,600,844 B2
(45) Date of Patent: Mar. 7, 2023

(54) SOLID-STATE BATTERY CELL AND SOLID-STATE BATTERY MODULE

(71) Applicant: HONDA MOTOR CO., LTD., Tokyo (JP)

(72) Inventors: Takuya Taniuchi, Saitama (JP); Masahiro Ohta, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 173 days.

(21) Appl. No.: 17/133,661

(22) Filed: Dec. 24, 2020

(65) Prior Publication Data

US 2021/0257654 A1 Aug. 19, 2021

(30) Foreign Application Priority Data

Feb. 14, 2020 (JP) .............................. JP2020-023389

(51) Int. Cl.
*H01M 10/04* (2006.01)
*H01M 10/0585* (2010.01)
*H01M 50/503* (2021.01)
*H01M 50/531* (2021.01)
*H01M 10/0525* (2010.01)

(52) U.S. Cl.
CPC ... *H01M 10/0468* (2013.01); *H01M 10/0525* (2013.01); *H01M 10/0585* (2013.01); *H01M 50/503* (2021.01); *H01M 50/531* (2021.01)

(58) Field of Classification Search
CPC ......... H01M 10/0468; H01M 10/0525; H01M 10/0585; H01M 10/482; H01M 10/0562; H01M 10/0565; H01M 10/04; H01M 50/503; H01M 50/531; H01M 50/103; H01M 50/474; H01M 50/533; H01M 50/54

See application file for complete search history.

(56) References Cited

U.S. PATENT DOCUMENTS

| 2006/0216582 | A1  | 9/2006 | Lee et al. | |
|---|---|---|---|---|
| 2012/0052341 | A1* | 3/2012 | Kim | ...................... H01M 50/10 429/186 |
| 2020/0067126 | A1* | 2/2020 | Han | ...................... H01M 4/382 |

FOREIGN PATENT DOCUMENTS

| JP | 2000106154 A | 4/2000 |
|---|---|---|
| JP | 2006278327 A | 10/2006 |

* cited by examiner

*Primary Examiner* — Matthew T Martin
*Assistant Examiner* — Adam J Francis
(74) *Attorney, Agent, or Firm* — CKC & Partners Co., LLC (57) ABSTRACT

The present invention provides a solid-state battery cell and a solid-state battery module including the same. The solid-state battery cell includes: a laminate including a positive electrode layer, a negative electrode layer, and a solid electrolyte layer present between the positive electrode layer and the negative electrode layer; a positive electrode tab connected to the positive electrode layer; a negative electrode tab connected to the negative electrode layer; and a pair of conductive clamping plates clamping the laminate from both sides in a laminating direction of the laminate. One of the pair of clamping plates is electrically connected to the positive electrode tab, and the other clamping plate is electrically connected to the negative electrode tab.

9 Claims, 7 Drawing Sheets

SOLID-STATE BATTERY CELL AND SOLID-STATE BATTERY MODULE

This application is based on and claims the benefit of priority from Japanese Patent Application No. 2020-023389, filed on 14 Feb. 2020, the content of which is incorporated herein by reference.

BACKGROUND OF THE INVENTION

Field of the Invention

The present invention relates to a solid-state battery cell and a solid-state battery module.

Related Art

Lithium ion secondary batteries have been widely used as secondary batteries having high energy density. A lithium ion secondary battery includes a separator interposed between a positive electrode and a negative electrode, and is filled with a liquid electrolyte (an electrolytic solution).

The electrolytic solution of the lithium ion secondary battery is generally a flammable organic solvent, and may cause, in particular, a problem of safety against heat. Therefore, a solid-state battery using an inorganic solid electrolyte in place of the liquid organic electrolyte has been proposed (see Patent Document 1). Compared to the battery using the electrolytic solution, a solid-state battery using the solid electrolyte can solve the problem of heat, can achieve high capacity and/or high voltage due to its layered structure, and can meet the demand of compactness.

When such a solid-state battery is used to drive a motor of a device that requires a large current or a large voltage, such as a hybrid electric vehicle, the solid-state battery is assembled into a secondary battery module. The secondary battery module includes a plurality of secondary batteries connected in series, a battery case having a space for housing the plurality of secondary batteries and electrode connectors, and module components connected to the battery case (see Patent Document 2).

In a conventional secondary battery module, battery cells are respectively housed in battery cases, and a space is left between each pair of the battery cell and the battery case to store gas generated when a liquid electrolyte is used. Module components such as bus bars and terminals connecting the bus bars are arranged outside the battery cases to be superimposed on the electrode connectors.

Patent Document 1: Japanese Unexamined Patent Application, Publication No. 2000-106154
Patent Document 2: Japanese Unexamined Patent Application, Publication No. 2006-278327

SUMMARY OF THE INVENTION

When two or more solid-state battery cells are connected together to produce the conventional secondary battery module, each of the solid-state battery cells requires the bus bar and the terminal connecting the bus bar for serial or parallel connection between the solid-state battery cells. In addition, the solid-state battery cells are housed in exterior members such as battery cases to be partitioned. This results in an increase in weight and size of the entire solid-state battery module, and a decrease in energy density of the module.

In view of the foregoing, the present invention has been achieved to provide a solid-state battery cell capable of improving the energy density when used to produce a solid-state battery module, and a solid-state battery module including the solid-state battery cells.

(1) The present invention relates to a solid-state battery cell including: a laminate including a positive electrode layer, a negative electrode layer, and a solid electrolyte layer present between the positive electrode layer and the negative electrode layer; a positive electrode tab connected to the positive electrode layer; a negative electrode tab connected to the negative electrode layer; and a pair of clamping plates clamping the laminate from both sides in a laminating direction of the laminate. One of the pair of clamping plates is electrically connected to the positive electrode tab, and the other clamping plate is electrically connected to the negative electrode tab.

(2) In the solid-state battery cell of (1), each of the pair of clamping plates includes a conductive support plate that supports a face of the laminate perpendicular to the laminating direction, and a conductive holding member that holds the laminate and the support plate in the laminating direction. Each of the positive electrode tab and the negative electrode tab is electrically connected to the support plate and the holding member.

(3) in the solid-state battery cell of (1) or (2), the positive electrode tab and the negative electrode tab are arranged on the same end face of the laminate perpendicular to the laminating direction.

(4) In the solid-state battery cell of (3), the positive electrode tab is arranged on one side of the laminate in a direction perpendicular to the laminating direction when in plan view, and the negative electrode tab is arranged on the other side of the laminate in the direction perpendicular to the laminating direction when in plan view.

(5) In the solid-state battery cell of (1) or (2), the positive electrode tab is arranged on an end face of the laminate on one side in a direction perpendicular to the laminating direction, and the negative electrode tab is arranged on an end face of the laminate opposite to the end face on the one side.

(6) In the solid-state battery cell of (5), each of the positive electrode tab and the negative electrode tab is arranged to extend over the laminate in a direction perpendicular to the laminating direction when in plan view.

(7) The present invention also relates to a solid-state battery module, including a plurality of solid-state battery cells of (1) or (2). The plurality of solid-state battery cells is arranged substantially parallel to each other in the laminating direction, and the positive electrode tab and the negative electrode tab are electrically connected to the positive electrode tab or negative electrode tab of an adjacent one of the solid-state battery cells via the clamping plates.

(8) The present invention also relates to a solid-state battery module, including a plurality of solid-state battery cells of (3) or (4). The plurality of solid-state battery cells is arranged substantially parallel to each other in the laminating direction, and the positive electrode tab and the negative electrode tab are electrically connected to the positive electrode tab or negative electrode tab of an adjacent one of the solid-state battery cells via the clamping plates.

(9) The present invention also relates to a solid-state battery module, including a plurality of solid-state battery cells of (5) or (6). The plurality of solid-state battery cells is arranged substantially parallel to each other in the laminating direction, and the positive electrode tab and the negative electrode tab are electrically connected to the positive electrode tab or negative electrode tab of an adjacent one of the solid-state battery cells via the clamping plates.

(10) The solid-state battery module of any one of (7) to (9) further includes a conductive spacer capable of adjusting positions of the solid-state battery cells in the laminating direction. The clamping plates adjacent to each other are connected together via the spacer.

The present invention can provide a solid-state battery cell capable of improving the energy density when used to produce a solid-state battery module, and a solid-state battery module including the solid-state battery cells.

DETAILED DESCRIPTION OF THE INVENTION

Embodiments of the present invention will be described below with reference to the drawings. Note that the present invention is not limited to the following embodiments.

<Solid-State Battery Cell of First Embodiment>

Figure 1:
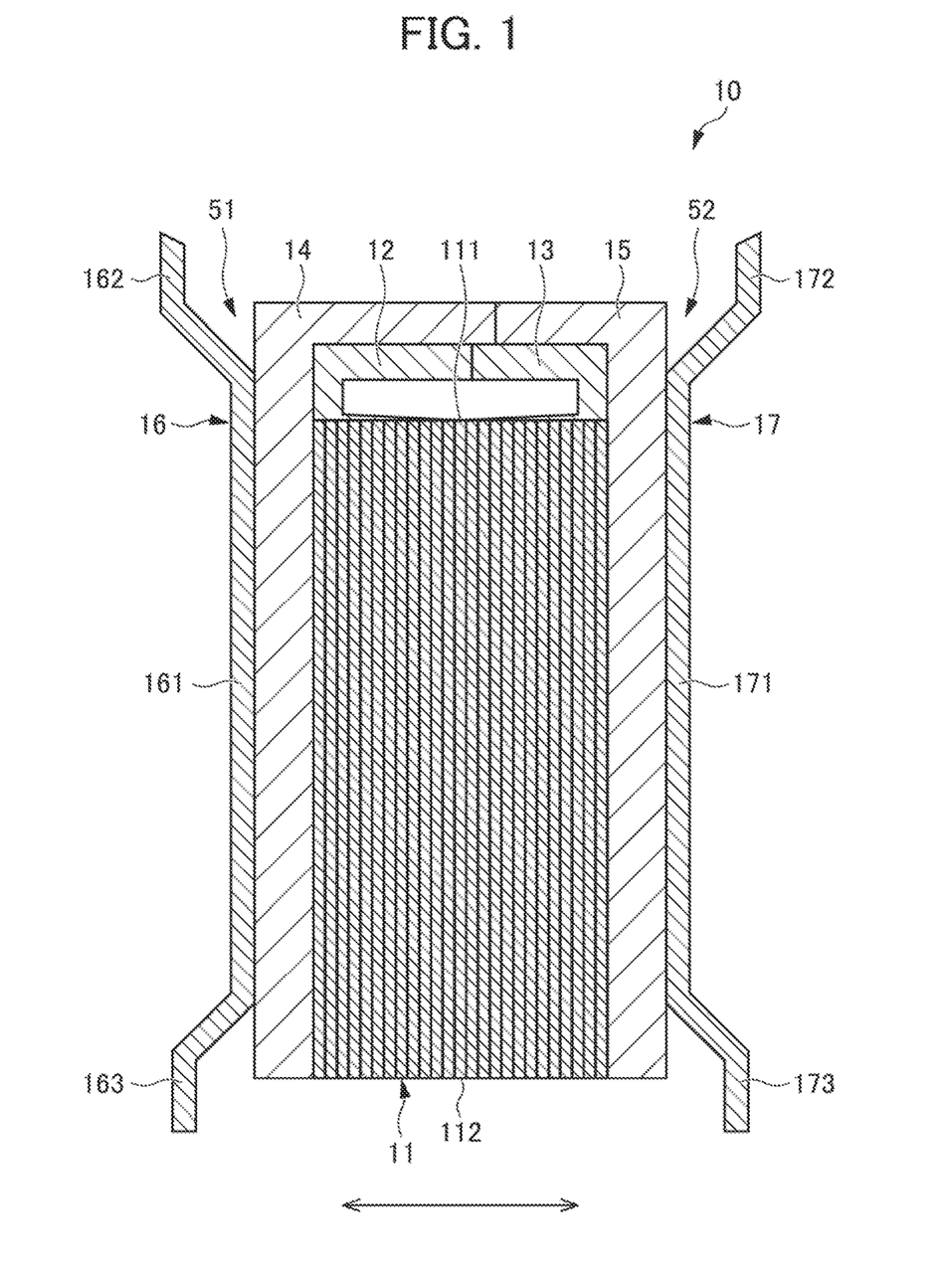
FIG. 1 is a sectional view illustrating a solid-state battery cell of a first embodiment of the present invention.
Figure 2:
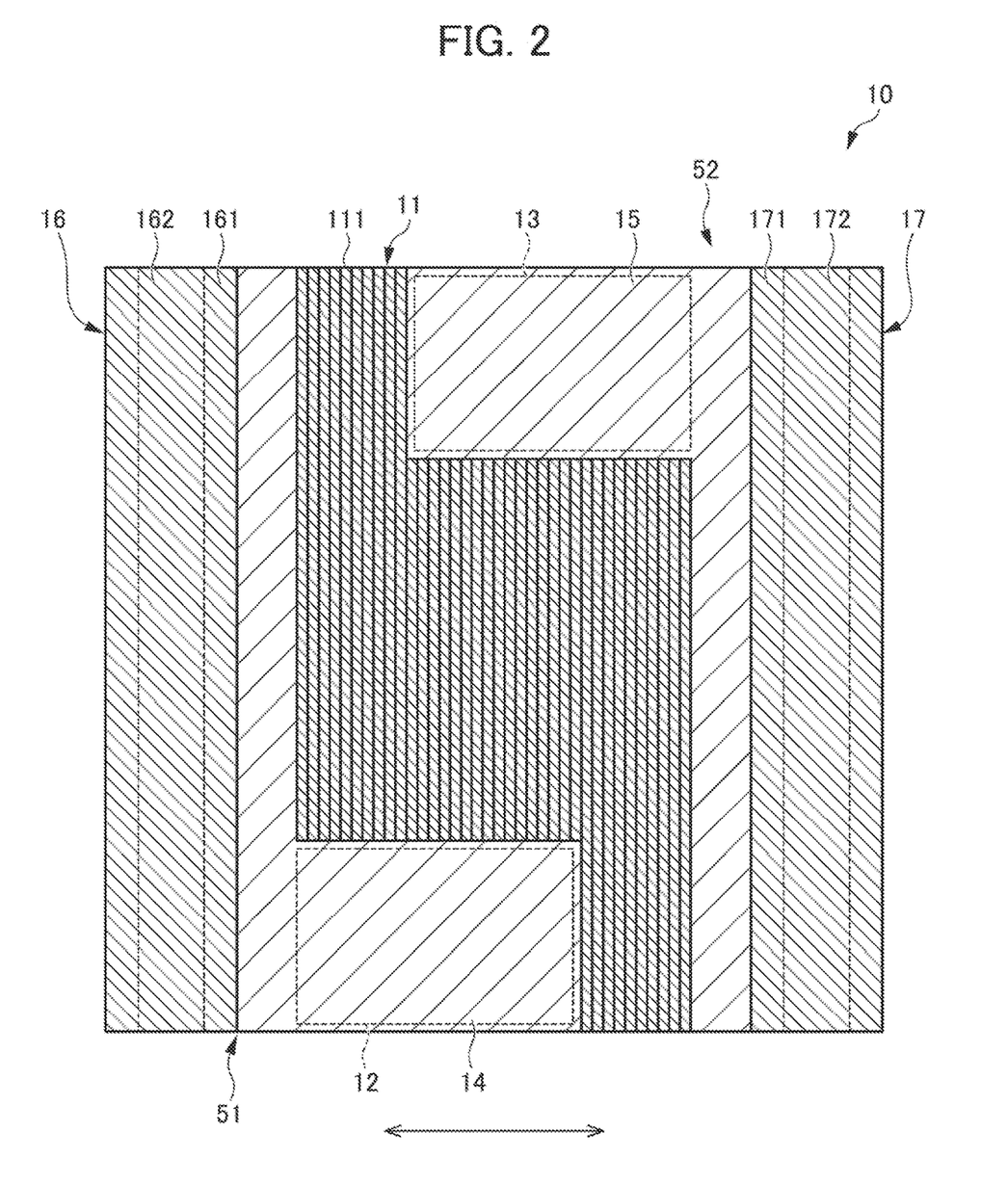
FIG. 2 is a plan view illustrating the solid-state battery cell of the first embodiment of the present invention.

A solid-state battery cell 10 of a first embodiment will be described below. FIG. 1 is a sectional view illustrating a solid-state battery cell 10. FIG. 2 is a plan view illustrating the solid-state battery cell 10.

The solid-state battery cell 10 includes a laminate 11, a positive electrode tab 12, a negative electrode tab 13, and a pair of clamping plates 51, 52.

(Laminate)

The laminate 11 is a stack of a positive electrode layer (not shown), a negative electrode layer (not shown), and a solid electrolyte layer (not shown) present between the positive electrode layer and the negative electrode layer.

The positive electrode layer and negative electrode layer of the laminate 11 are not particularly limited, and may be any layers as long as they can be used as a positive electrode and negative electrode of a solid-state battery. Each of the positive and negative electrode layers contains an active material and a solid electrolyte, and may optionally contain any other suitable ingredients such as a conductive agent and a binder.

The solid electrolyte layer in the laminate 11 contains a binder or any other suitable ingredients as needed. In the present invention, a substance to be contained in the solid electrolyte layer is not particularly limited as long as the substance can be used as an electrolyte of a solid-state battery. For example, an oxide-based solid electrolyte, and a sulfide-based solid electrolyte can be used.

The solid electrolyte layer is not particularly limited in terms of thickness and shape thereof as long as the solid electrolyte layer is properly present between the positive and negative electrode layers, and enables ion conduction between the positive and negative electrode layers. A production method thereof is not particularly limited.

(Positive Electrode Tab and Negative Electrode Tab)

The positive electrode tab 12 and the negative electrode tab 13 are members that function as current collectors of the solid-state battery. The positive electrode tab 12 is connected to collector foil of the positive electrode layer of the laminate 11. The negative electrode tab 13 is connected to collector foil of the negative electrode layer of the laminate 11.

The positive and negative electrode tabs of the solid-state battery of the present invention are not particularly limited in terms of material and structure thereof as long as they can serve as the current collector used for the solid-state battery. In the present invention, for example, metal foil having a thickness of about 5 μm to 500 μm can be used.

As shown in FIG. 1, the positive electrode tab 12 and the negative electrode tab 13 are arranged on the same end face 111 of the laminate 11 relative to a laminating direction of the laminate 11 (will be hereinafter referred to as a "laminating direction"). In FIGS. 1 to 7, a two-way arrow indicates the laminating direction.

As shown in FIG. 2, the positive electrode tab 12 is arranged on one side (left side in FIG. 2) of the laminate 11 in a direction perpendicular to the laminating direction when in plan view, and the negative electrode tab 13 is arranged on the other side (right side in FIG. 2) of the laminate 11 in the direction perpendicular to the laminating direction when in plan view.

As shown in FIG. 1, the positive electrode tab 12 and the negative electrode tab 13 are arranged to protrude from the end face 111. Specifically, the positive electrode tab 12 extends in a direction substantially perpendicular to the end face 111, and then extends in the laminating direction toward the negative electrode tab 13. The negative electrode tab 13 extends in the direction substantially perpendicular to the end face 111, and then extends in the laminating direction toward the positive electrode tab 12.

Since the positive and negative electrode tabs 12 and 13 are arranged on the same end face 111 of the laminate 11, space for arranging the positive and negative electrode tabs 12 and 13 is no longer necessary on an end face other than the end face 111. Thus, for example, the laminate 11 can be extended toward an end face 112, which can ensure a larger volume of the laminate 11. This can increase the volume of the laminate 11 in the solid-state battery cell 10, and can improve the energy density of the solid-state battery cell 10 itself.

(Clamping Plates)

The pair of clamping plates 51, 52 is a pair of conductive members clamping the laminate 11 from both sides in the laminating direction of the laminate 11. Specifically, as shown in FIG. 1, the clamping plate 51 is arranged on the positive electrode layer of the laminate 11, and is electrically connected to the positive electrode tab 12. The clamping plate 52 is arranged on the negative electrode layer of the laminate 11, and is electrically connected to the negative electrode tab 13.

As shown in FIG. 1, the clamping plate 51 includes a support plate 14 and a holding member 16, and the clamping plate 52 includes a support plate 15 and a holding member 17.

The support plates 14, 15 will be described below. The support plates 14, 15 are conductive plate members that support faces of the laminate 11 perpendicular to the laminating direction. The support plate 14 supports the face of the laminate 11 where the positive electrode layer is present, and is electrically connected to the positive electrode tab 12. Specifically, the support plate 14 is in surface contact with the entire face of the laminate 11 where the positive electrode layer is present, and is welded to the positive electrode tab 12.

The support plate 15 supports the face of the laminate 11 where the negative electrode layer is present, and is electrically connected to the negative electrode tab 13. Specifically, the support plate 15 is in surface contact with the entire face of the laminate 11 where the negative electrode layer is present, and is welded to the negative electrode tab 13. The support plates 14, 15 and the positive and negative electrode tabs 12, 13 may be connected by any method without particular limitation as long as they are brought into conduction. For example, the electrical connection can be established by fastening.

The holding members 16, 17 will be described next. The holding members 16, 17 are conductive plate members, and apply surface pressure to the laminate 11 by a spring force. The holding members 16, 17 are electrically connected to the laminate 11 and the support plate 14 or the support plate 15, and also serve as terminals.

The holding member 16 is arranged across the support plate 14 from the laminate 11 in the laminating direction. The holding member 16 includes a pressing portion 161 and terminal portions 162, 163.

The pressing portion 161 makes surface contact with a face (will be hereinafter referred to as an "outer face") of the support plate 14 opposite to the face in contact with the laminate 11. The pressing portion 161 is formed along the outer face of the support plate 14, and applies surface pressure to the support plate 14 in the laminating direction.

As shown in FIG. 1, the terminal portion 162 extends obliquely with respect to a direction substantially parallel to the positive electrode layer from an end face of the pressing portion 161 near the end face 111 when viewed in section, and then further extends in a direction substantially parallel to the positive electrode layer away from the support plate 14 (upward in FIG. 1). The terminal portion 163 extends obliquely with respect to a direction substantially parallel to the positive electrode layer from an end face of the pressing portion 161 near the end face 112 when viewed in section, and then further extends in a direction substantially parallel to the positive electrode layer away from the support plate 14 (downward in FIG. 1).

The holding member 17 is arranged across the support plate 15 from the laminate 11 in the laminating direction. The holding member 17 includes a pressing portion 171 and terminal portions 172, 173.

The pressing portion 171 makes surface contact with a face (will be hereinafter referred to as an "outer face") of the support plate 15 opposite to the face in contact with the laminate 11. The pressing portion 171 is formed along the outer face of the support plate 15, and applies surface pressure to the support plate 15 in the laminating direction.

As shown in FIG. 1, the terminal portion 172 extends obliquely with respect to a direction substantially parallel to the negative electrode layer from an end face of the pressing portion 171 near the end face 111 when viewed in section, and then further extends in a direction substantially parallel to the negative electrode layer away from the support plate 15 (upward in FIG. 1). The terminal portion 173 extends obliquely with respect to a direction substantially parallel to the negative electrode layer from an end face of the pressing portion 171 near the end face 112 when viewed in section, and then further extends in a direction substantially parallel to the negative electrode layer away from the support plate 15 (downward in FIG. 1).

The solid-state battery cell 10 of the first embodiment includes a pair of clamping plates 51, 52 that clamps the laminate 11 from both sides in the laminating direction, and is electrically connected to the positive electrode tab 12 or the negative electrode tab 13. Thus, the clamping plates 51, 52 arranged on both sides of the laminate 11 are respectively conducted and integrated with the positive electrode tab 12 or the negative electrode tab 13, and the solid-state battery cells 10 adjacent to each other can be electrically connected via the clamping plate 51, 52 without using any bus bar or terminal. Further, since the clamping plates 51, 52 can keep the laminated structure of the laminate 11, an exterior member for housing a single solid-state battery cell 10, such as a battery case, is no longer necessary. This can reduce the weight and size of the solid-state battery module 1, and can improve the energy density.

The holding members 16, 17 of the clamping plates 51, 52 apply surface pressure while sandwiching the positive electrode layer, the negative electrode layer, the solid electrolyte layer, and the pair of support plates 14, 15 in the laminating direction. This makes it possible to apply an initial load to the single solid-state battery cell 10, reduce contact resistance, and improve input-output characteristics and vibration resistance.

Moreover, the clamping plates 51, 52 apply the surface pressure generated by the holding members 16, 17 to the laminate 11 via the support plates 14, 15 that entirely support the faces of the laminate 11 perpendicular to the laminating direction. Thus, the pressure can be uniformly applied to the laminate 11.

<Solid-State Battery Module of First Embodiment>

Figure 3:
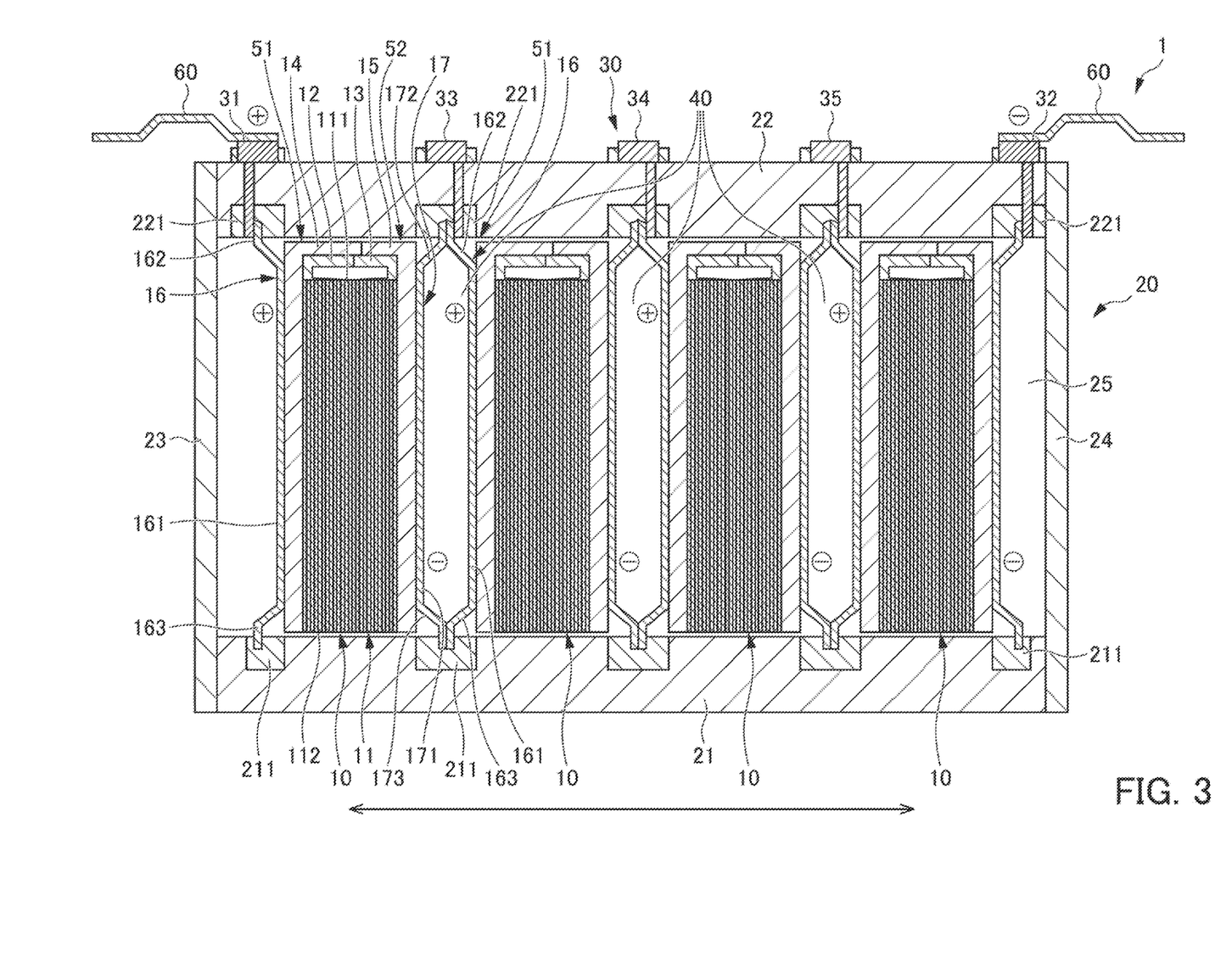
FIG. 3 is a sectional view illustrating a solid-state battery module including the solid-state battery cells of the first embodiment of the present invention.

A solid-state battery module 1 including the solid-state battery cells 10 of the first embodiment will be described below. FIG. 3 is a sectional view illustrating the solid-state battery module 1.

The solid-state battery module 1 includes a plurality of solid-state battery cells 10, a cell housing 20, and a module component 30.

The cell housing 20 is a container that houses the plurality of solid-state battery cells 10. The cell housing 20 includes a lower plate 21, a top cover 22, and end plates 23, 24.

The lower plate 21 forms a lower face of the cell housing 20. The top cover 22 forms an upper face of the cell housing 20, and is arranged substantially parallel to the lower plate 21. The lower plate 21 and the top cover 22 are provided with recesses 211, 221 for housing the terminal portions 162, 163, 172, 173 of the solid-state battery cells 10. Each of the end plates 23, 24 is attached to the lower plate 21 and the top cover 22, and forms a side face of the solid-state battery module 1. The lower plate 21, the top cover 22, and the end plates 23, 24 form a housing space 25 that houses the solid-state battery cells 10.

The cell housing 20 of the solid-state battery module 1 houses a plurality of solid-state battery cells 10. In the present embodiment, the housing space 25 houses four solid-state battery cells 10. As shown in FIG. 3, the solid-state battery cells 10 are arranged substantially parallel to each other in the laminating direction. Each of the solid-state battery cells 10 is arranged such that the end face 11*l* of the laminate 11 is positioned near the top cover 22, and the end face 112 is positioned near the lower plate 21.

As shown in FIG. 3, tip ends of the terminal portions 162, 172 of the solid-state battery cells 10 are arranged in the recesses 221 of the top cover 22, and fixed to the top cover 22 by an insulating coating, an insulating film, or gaskets.

The tip ends of the terminal portions 162, 172 are connected to the module component 30 such as external terminals 31, 32 which will be described later. Tip ends of the terminal portions 163, 173 are arranged in the recesses 211 of the lower plate 21, and fixed to the lower plate 21 by an insulating coating, an insulating film, or gaskets.

The holding member 16 of the solid-state battery cell 10 is directly connected to the holding member 17 of the other adjacent solid-state battery cell 10. Specifically, as shown in FIG. 3, the terminal portion 162 is directly welded to the terminal portion 172 of the adjacent solid-state battery cell 10 in the recess 221, and the terminal portion 163 is directly welded to the terminal portion 173 of the adjacent solid-state battery cell 10 in the recess 211. Thus, the positive electrode tab 12 of the solid-state battery cell 10 is electrically connected to the negative electrode tab 13 of the adjacent solid-state battery cell 10 via the clamping plates 51, 52.

Likewise, the holding member 17 of the solid-state battery cell 10 is directly connected to the holding member 16 of the other adjacent solid-state battery cell 10. Specifically, as shown in FIG. 3, the terminal portion 172 is directly welded to the terminal portion 162 of the adjacent solid-state battery cell 10 in the recess 221, and the terminal portion 163 is directly welded to the terminal portion 173 of the adjacent solid-state battery cell 10 in the recess 211. Thus, the negative electrode tab 13 of the solid-state battery cell 10 is electrically connected to the positive electrode tab 12 of the adjacent solid-state battery cell 10 via the clamping plates 51, 52. In this configuration, the solid-state battery cells 10 in the solid-state battery module 1 are connected in series.

(Module Component)

The module component 30 includes external terminals 31, 32 and voltage detection terminals 33, 34, 35. Each of the external terminals 31, 32 and the voltage detection terminals 33, 34, 35 is provided to extend from an upper face of the top cover 22 to the recess 221. Specifically, each of the external terminals 31, 32 and the voltage detection terminals 33, 34, 35 has one end exposed on the upper face of the top cover 22, and the other end located in the recess 221.

The external terminals 31, 32 are insulated from each other and arranged on the top cover 22. The external terminal 31 is electrically connected to the terminal portion 162 near the end plate 23 by welding in the recess 221. The external terminal 32 is electrically connected to the terminal portion 172 near the end plate 24 by welding in the recess 221. In this configuration, the solid-state battery module 1 having the external terminal 31 as a positive electrode terminal and the external terminal 32 as a negative electrode terminal is formed.

Further, as shown in FIG. 3, bus bars 60 are respectively connected to the external terminals 31, 32. The bus bars 60 can electrically connect the solid-state battery modules 1 adjacent to each other. Specifically, the external terminal 31 of the solid-state battery module 1 can be connected to the external terminal 32 of an adjacent solid-state battery module 1 via the bus bar 60. The external terminal 32 of the solid-state battery module 1 can be connected to the external terminal 31 of an adjacent solid-state battery module 1 via the bus bar 60.

Each of the voltage detection terminals 33, 34, 35 is electrically connected to the terminal portions 162 and 172 by welding in the recess 221 near the center of the top cover 22. The voltage detection terminals 33, 34, 35 can be used as voltage monitoring terminals or terminals for an equalization circuit.

(Void)

As shown in FIG. 3, the holding members 16, 17 form a void 40 between the adjacent solid-state battery cells 10.

The void 40 may preferably contain at least one selected from the group consisting of fluid such as air and water, a heat transfer material, and a heater which control the cell temperature, an electrical insulator or an electrical conductor for allowing the module to function, and a buffer. The void 40 thus formed can provide the module with insulation and heat dissipation properties.

(Heat Sink)

A heat sink is preferably arranged on a face of the holding member 16, 17 toward the void 40. The heat sink can increase a cooling area to improve cooling efficiency, and other cooling means such as cooling water can be omitted. The configuration of the heat sink is not particularly limited, and its size is not particularly limited as long as the heat sink can be arranged in the void 40.

The heat sink, if arranged on the holding member 16, 17, is preferably a fin. The fin can increase the surface area of the battery case, and is preferably used in terms of cooling efficiency. The fin may be made of any material without particular limitation as long as it can exhibit good thermal conductivity. Its shape is not particularly limited.

If the heat sink is made to have a bumpy shape, the shape is preferably, for example, a corrugated shape, but is not particularly limited thereto. If the heat sink has the corrugated shape, the holding members 16, 17 can produce highly uniform spring pressure. The corrugated shape may be, for example, a triangular wave shape, a sawtooth wave shape, a rectangular wave shape, and a sine wave shape.

In the solid-state battery module 1 of the present embodiment, the solid-state battery cells 10 housed in the cell housing 20 are arranged substantially parallel to each other in the laminating direction, and a gap formed between the cell housing 20 and each solid-state battery cell 10 can be reduced. This can increase the area occupied by the solid-state battery cells 10 in the housing space 25. Further, since each of the solid-state battery cells 10 is not housed in an exterior member such as a battery case, but is exposed in the housing space 25, the energy density of the solid-state battery cell 10 itself improves. In addition, each of the solid-state battery cells 10 is electrically connected to adjacent solid-state battery cells 10 via the positive electrode tab 12, the negative electrode tab 13, and the clamping plates 51, 52 without using any bus bars and terminals, which can reduce the volume of the solid-state battery module 1. Therefore, the weight and size of the solid-state battery module 1 can be reduced, and the energy density can be improved.

In the solid-state battery module 1, the solid-state battery cells 10 are arranged such that the terminal portions 162, 172 of the holding members 16, 17 that serve as the current collectors extend upward. This facilitates the connection with the external terminals 31, 32.

Since the positive and negative electrode tabs 12 and 13 are arranged on the same end face 111 of the laminate 11 in the solid-state battery module 1, space for arranging the positive and negative electrode tabs 12 and 13 is no longer necessary on an end face other than the end face 111. Thus, for example, the laminate 11 can be extended toward an end face 112, which can ensure a larger volume of the laminate 11. This can increase the volume of the laminate 11 in each solid-state battery cell 10, and can improve the energy density of each solid-state battery cell 10.

Further, in the solid-state battery module 1, both ends of the adjacent holding members 16, 17 are directly connected to each other. This can increase an electrical contact area, and heat generation does not easily occur even when a large current is applied. In addition, the holding members 16, 17 can uniformly apply the surface pressure to the laminate 11. Thus, the solid-state battery module 1 can improve in durability.

<Solid-State Battery Cell of Second Embodiment>

Figure 4:
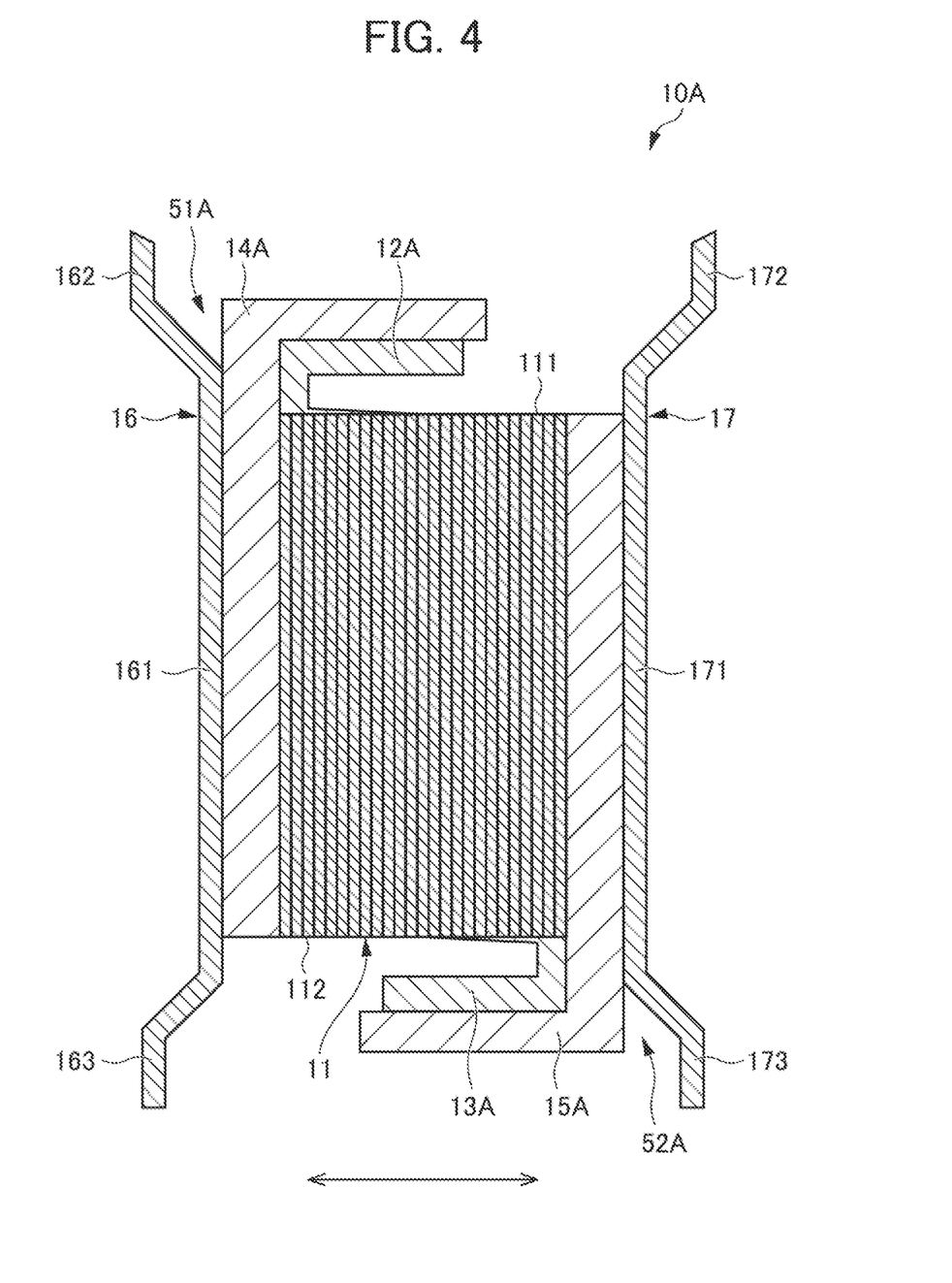
FIG. 4 is a sectional view illustrating a solid-state battery cell of a second embodiment of the present invention.
Figure 5:
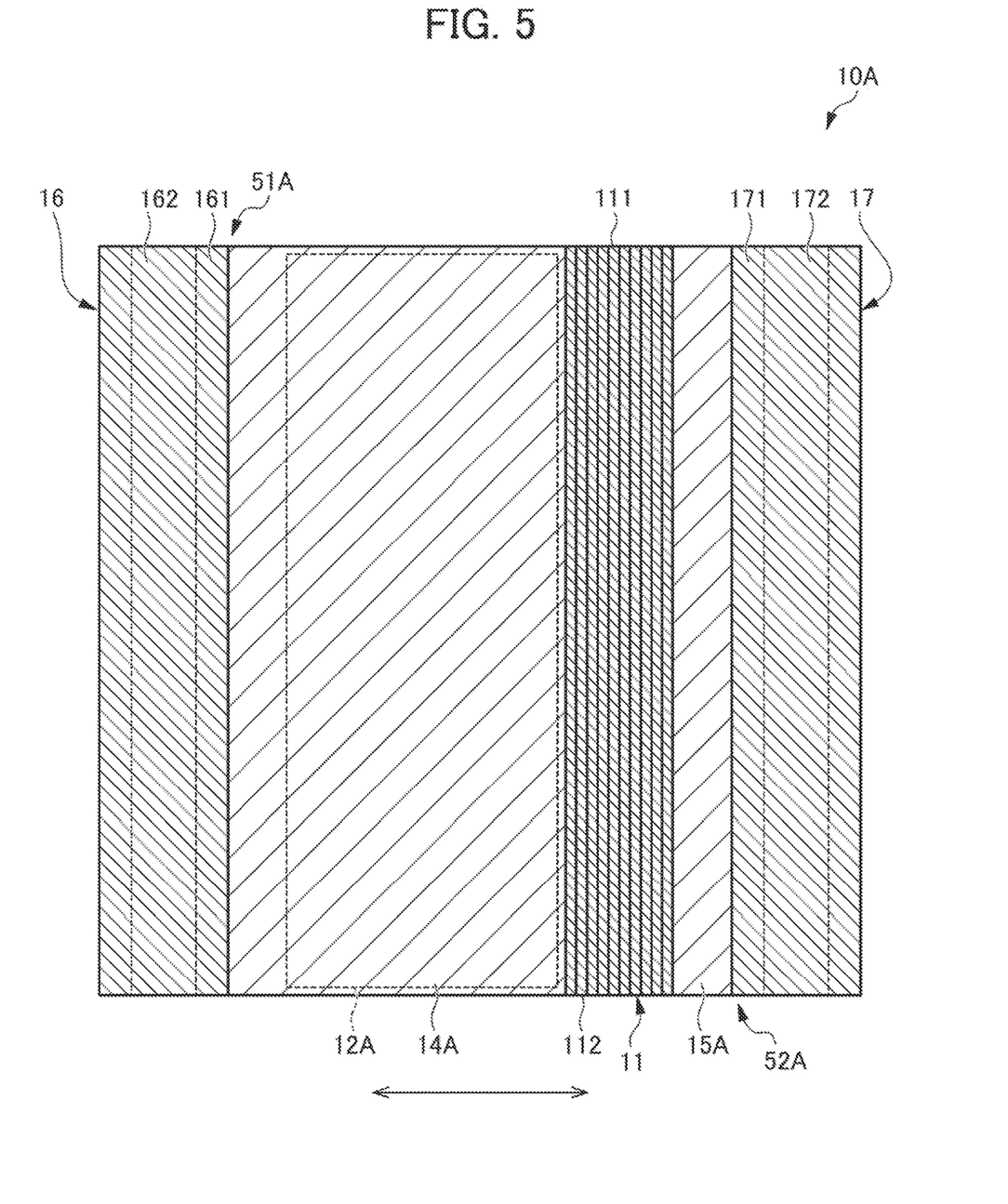
FIG. 5 is a plan view illustrating the solid-state battery cell of the second embodiment of the present invention.

A solid-state battery cell 10A of a second embodiment will be described below. Components similar to those described in the above embodiment are designated by similar reference characters, and description of these components may not be repeated. FIG. 4 is a sectional view illustrating the solid-state battery cell 10A. FIG. 5 is a plan view illustrating the solid-state battery cell 10A.

The solid-state battery cell 10A includes, a laminate 11, a positive electrode tab 12A, a negative electrode tab 13A, and clamping plates 51A, 52A. The solid-state battery cell 10A of the second embodiment is mainly different from that of the first embodiment in the position of the negative electrode tab 13A on the laminate 11.

(Positive Electrode Tab and Negative Electrode Tab)

As shown in FIG. 4, the positive electrode tab 12A is arranged on an end face 111 of the laminate 11, and the negative electrode tab 13A is arranged on an end face 112 opposite to the end face 111. Further, as shown in FIG. 5, the positive electrode tab 12A is arranged to extend over the end face 111 in a direction perpendicular to the laminating direction when in plan view. Likewise, the negative electrode tab 13A is also arranged to extend over the end face 112 in the direction perpendicular to the laminating direction of the laminate 11 when in plan view.

As shown in FIG. 4, the positive electrode tab 12A extends in a direction substantially perpendicular to the end face 111, and then further extends in the laminating direction toward the holding member 17. The negative electrode tab 13 extends in a direction substantially perpendicular to the end face 112, and then extends in the laminating direction toward the holding member 16.

(Clamping Plates)

As shown in FIG. 4, the clamping plate 51A includes a support plate 14A and a holding member 16, and the clamping plate 52A includes a support plate 15A and a holding member 17. The holding members 16, 17 are configured in the same manner as those of the first embodiment, and the description is not repeated.

The support plates 14A, 15A are conductive plate members that support faces of the laminate 11 perpendicular to the laminating direction. Just like the support plates 14, 15 of the first embodiment, the support plates 14A, 15A also function as terminals for connection with other solid-state battery cells 10A.

The support plate 14A supports the face of the laminate 11 where the positive electrode layer is present, and is electrically connected to the positive electrode tab 12A. Specifically, the support plate 14A is in surface contact with the entire face of the laminate 11 where the positive electrode layer is present, and is welded to the positive electrode tab 12A.

The support plate 15A supports the face of the laminate 11 where the negative electrode layer is present, and is electrically connected to the negative electrode tab 13A. Specifically, the support plate 15A is in surface contact with the entire face of the laminate 11 where the negative electrode layer is present, and is welded to the negative electrode tab 13A. The support plates 14A, 15A and the positive and negative electrode tabs 12A, 13A may be connected by any method without particular limitation as long as they are brought into conduction. For example, the electrical connection can be established by fastening.

In the present embodiment, the positive electrode tab 12A and the negative electrode tab 13A are arranged separately on the different end faces 111, 112. Thus, the positive electrode tab 12A and the negative electrode tab 13A can be arranged to extend over the end faces 111, 112 in the direction perpendicular to the laminating direction. This can increase the area of the positive and negative electrode tabs 12A and 13A, and the current can be easily taken out from the solid-state battery cell 10A.

<Solid-State Battery Module of Second Embodiment>

Figure 6:
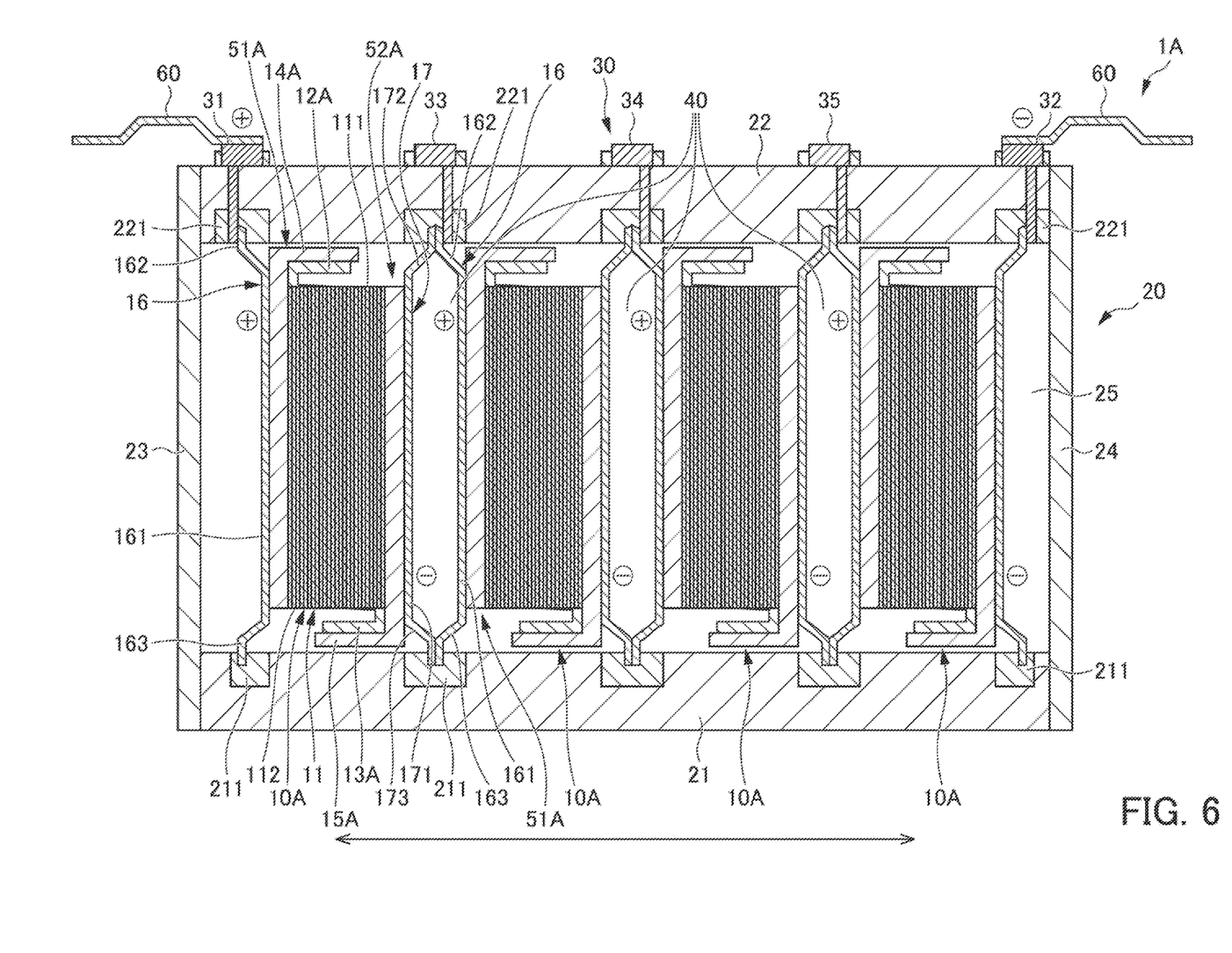
FIG. 6 is a sectional view illustrating a solid-state battery module including the solid-state battery cells of the second embodiment of the present invention.

A solid-state battery module 1A including the solid-state battery cells 10A of the second embodiment will be described below. FIG. 6 is a sectional view illustrating the solid-state battery module 1A.

The solid-state battery module 1A includes a plurality of solid-state battery cells 10A, a cell housing 20, and a module component 30. The solid-state battery module 1A is mainly different from the solid-state battery module 1 in that the solid-state battery cells 10 are replaced with the solid-state battery cells 10A.

The cell housing 20 of the solid-state battery module 1A houses a plurality of solid-state battery cells 10A. In the present embodiment, the housing space 25 houses four solid-state battery cells 10A. As shown in FIG. 6, the solid-state battery cells 10A are arranged substantially parallel to each other in the laminating direction. Each of the solid-state battery cells 10A is arranged such that the end face 111 of the laminate 11 is positioned near the top cover 22, and the end face 112 is positioned near the lower plate 21.

The holding member 16 of the solid-state battery cell 10A is directly connected to the holding member 17 of the other adjacent solid-state battery cell 10A. Specifically, as shown in FIG. 6, the terminal portion 162 is directly welded to the terminal portion 172 of the adjacent solid-state battery cell 10A in the recess 221, and the terminal portion 163 is directly welded to the terminal portion 173 of the adjacent solid-state battery cell 10A in the recess 211. Thus, the positive electrode tab 12A of the solid-state battery cell 10A is electrically connected to the negative electrode tab 13A of the adjacent solid-state battery cell 10A via the clamping plates 5A, 52A.

Likewise, the holding member 17 of the solid-state battery cell 10A is directly connected to the holding member 16 of the other adjacent solid-state battery cell 10A. Specifically, as shown in FIG. 6, the terminal portion 172 is directly welded to the terminal portion 162 of the adjacent solid-state battery cell 10A in the recess 221, and the terminal portion 173 is directly welded to the terminal portion 163 of the adjacent solid-state battery cell 10A in the recess 211. Thus, the negative electrode tab 13A of the solid-state battery cell 10A is electrically connected to the positive electrode tab 12A of the adjacent solid-state battery cell 10A via the clamping plates 51A, 52A. In this configuration, the solid-state battery cells 10A in the solid-state battery module 1A are connected in series.

In the solid-state battery module 1A, the solid-state battery cells 10A housed in the cell housing 20 are arranged substantially parallel to each other in the laminating direction, which can increase the area occupied by the solid-state battery cells 10A in the housing space 25. Further, the absence of an exterior member such as a battery case that houses each of the solid-state battery cells 10A, bus bars, and terminals can improve the energy density. In each of the solid-state battery cells 10A, the positive electrode tab 12A and the negative electrode tab 13A are arranged separately on the different end faces 111, 112, which can increase the area of the positive and negative electrode tabs 12A and 13A, and the current can be easily taken out from the solid-state battery cells 10A.

Figure 7:
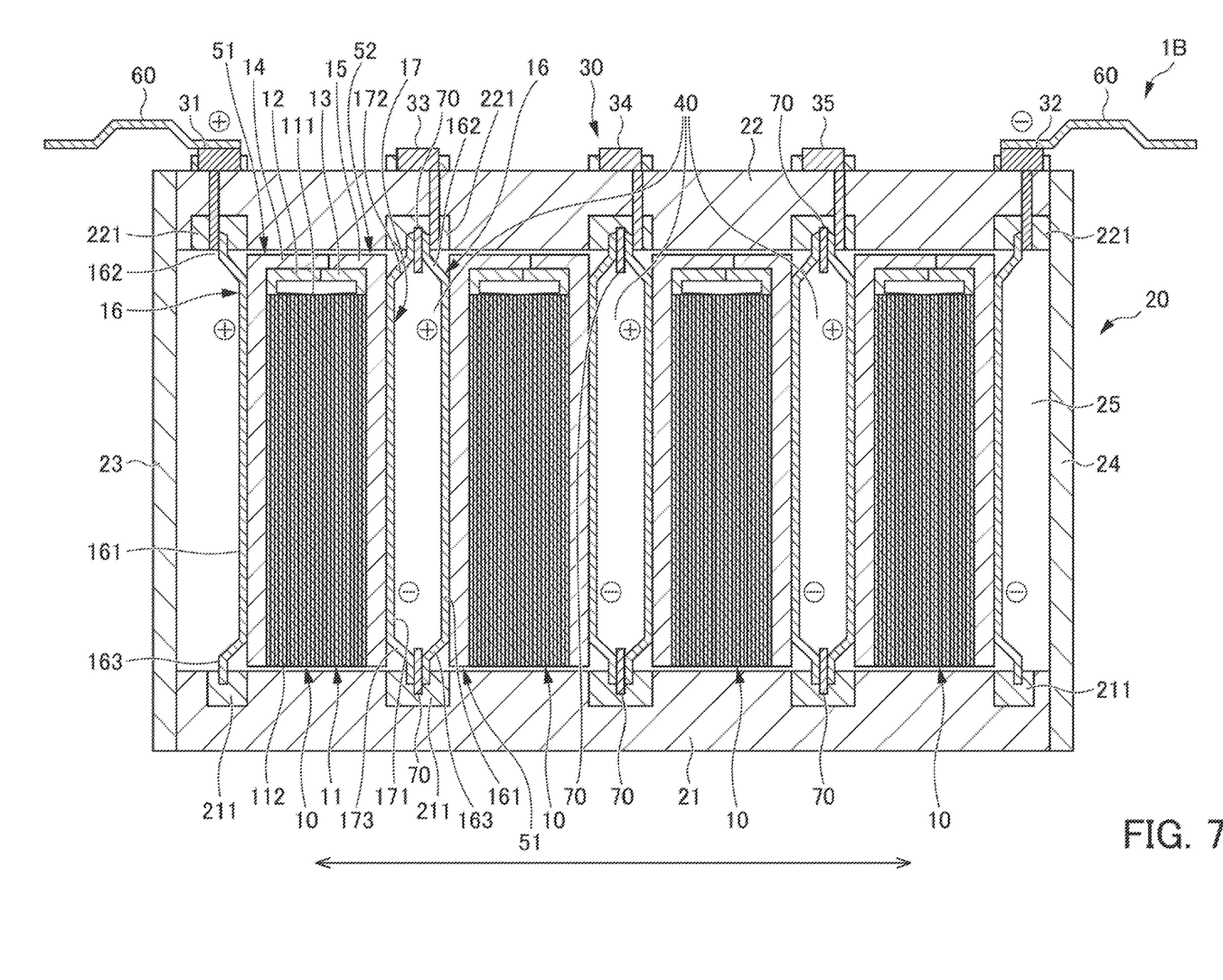
FIG. 7 is a sectional view illustrating a variation of the solid-state battery module including the solid-state battery cells of the first embodiment of the present invention.

As a variation of the first embodiment, a solid-state battery module 1B including the solid-state battery cells 10 of the first embodiment will be described below. FIG. 7 is a sectional view illustrating the solid-state battery module 1B according to the variation of the first embodiment.

The solid-state battery module 1B includes a plurality of solid-state battery cells 10, a cell housing 20, a module component 30, and conductive spacers 70 capable of adjusting the positions of the solid-state battery cells 10 in the laminating direction. The solid-state battery module 1B is different from the solid-state battery module 1 in the connection between the adjacent clamping plates 51, 52.

As shown in FIG. 7, in the solid-state battery module 1B, the terminal portions 162 and 172 adjacent to each other are not directly connected, but are connected via the spacer 70. Likewise, the terminal portions 163 and 173 adjacent to each other are not directly connected, but are electrically connected via the spacer 70.

In the solid-state battery module 1B, the adjacent clamping plates 51, 52 are connected together via the spacer 70. Thus, adjustment of the size of the spacer 70 can adjust the position of each solid-state battery cell 10 housed in the cell housing 20 in the laminating direction. This can reduce variations in stress applied to the laminates 11 without changing the dimension of the cell housing 20 even if the solid-state battery cells 10 housed in the cell housing 20 have different dimensions in the laminating direction.

The module of this variation is configured to include the solid-state battery cells 10 of the first embodiment. However, the solid-state battery cells 10 may be replaced with the solid-state battery cells 10A of the second embodiment.

The solid-state battery modules 1, 1A of the above-described embodiments can be used in various types of devices. The solid-state battery modules 1, 1A have a small volume and high energy density, and the terminals are not easily misaligned due to vibration. Thus, the solid-state battery modules can be advantageously used as a power source of not only mobile devices, but also electric vehicles and hybrid vehicles, for example.

The embodiments have just been described as examples of the present invention. However, the present invention is not limited to the embodiments and variation described above, and can be modified as needed.

In the embodiments and variation described above, the solid-state battery cells 10, 10A include the support plates 14, 15, 14A, 15A and the holding members 16, 17. However, the solid-state battery cells 10, 10A may not include support plates 14, 15, 14A, 15A or holding members 16, 17. Further, in the solid-state battery module 1, 1A, a plurality of solid-state battery cells having no support plates 14, 15, 14A, 15A or holding members 16, 17 may be assembled into a module by electrically connecting the positive and negative electrode tabs of the adjacent solid-state battery cells.

In the embodiments and variation described above, the solid-state battery cells 10, 10A are connected in series in the solid-state battery module 1, 1A, but may be connected in parallel.

EXPLANATION OF REFERENCE NUMERALS 1, 1A Solid-State Battery Module
10, 10A Solid-State Battery Cell
11 Laminate
12, 12A Positive Electrode Tab
13, 13A Negative Electrode Tab
51, 51A, 52, 52A Clamping Plate

What is claimed is:

1. A solid-state battery cell, comprising:
a laminate including a positive electrode layer, a negative electrode layer, and a solid electrolyte layer present between the positive electrode layer and the negative electrode layer;
a positive electrode tab connected to the positive electrode layer;
a negative electrode tab connected to the negative electrode layer; and
a pair of conductive clamping plates clamping the laminate from both sides in a laminating direction of the laminate,
wherein
one of the pair of clamping plates is electrically connected to the positive electrode tab, and the other clamping plate is electrically connected to the negative electrode tab,
each of the pair of clamping plates includes a conductive support plate that supports a face of the laminate perpendicular to the laminating direction,
a conductive holding member holds the laminate and the support plate in the laminating direction, and
each of the positive electrode tab and the negative electrode tab is electrically connected to the support plate and the holding member.

2. The solid-state battery cell of claim 1, wherein the positive electrode tab and the negative electrode tab are arranged on the same end face of the laminate perpendicular to the laminating direction.

3. The solid-state battery cell of claim 2, wherein the positive electrode tab is arranged on one side of the laminate in a direction perpendicular to the laminating direction on the same end face, and
the negative electrode tab is arranged on the other side of the laminate in the direction perpendicular to the laminating direction on the same end face.

4. The solid-state battery cell of claim 1, wherein the positive electrode tab is arranged on an end face of the laminate on one side in a direction perpendicular to the laminating direction, and
the negative electrode tab is arranged on an end face of the laminate opposite to the end face on the one side.

5. The solid-state battery cell of claim 4, wherein each of the positive electrode tab and the negative electrode tab is arranged to extend over the laminate in a direction perpendicular to the laminating direction when in plan view.

6. A solid-state battery module, comprising a plurality of solid-state battery cells of claim 1, wherein
the plurality of solid-state battery cells is arranged substantially parallel to each other in the laminating direction, and
the positive electrode tab and the negative electrode tab are electrically connected to the positive electrode tab or negative electrode tab of an adjacent one of the solid-state battery cells via the clamping plates.

7. A solid-state battery module, comprising a plurality of solid-state battery cells of claim 2, wherein
the plurality of solid-state battery cells is arranged substantially parallel to each other in the laminating direction, and
the positive electrode tab and the negative electrode tab are electrically connected to the positive electrode tab or negative electrode tab of an adjacent one of the solid-state battery cells via the clamping plates.

8. A solid-state battery module, comprising a plurality of solid-state battery cells of claim 4, wherein
the plurality of solid-state battery cells is arranged substantially parallel to each other in the laminating direction, and
the positive electrode tab and the negative electrode tab are electrically connected to the positive electrode tab or negative electrode tab of an adjacent one of the solid-state battery cells via the clamping plates.

9. The solid-state battery module of claim 6, further comprising: a conductive spacer capable of adjusting positions of the solid-state battery cells in the laminating direction, wherein
the clamping plates adjacent to each other are connected together via the spacer.

* * * * *